United States Patent [19]

Mouritzen

[11] Patent Number: 5,154,051

[45] Date of Patent: Oct. 13, 1992

[54] AIR LIQUEFIER AND SEPARATOR OF AIR CONSTITUENTS FOR A LIQUID AIR ENGINE

[75] Inventor: Gunnar Mouritzen, San Diego, Calif.

[73] Assignee: General Dynamics Corporation, San Diego, Calif.

[21] Appl. No.: 600,655

[22] Filed: Oct. 22, 1990

[51] Int. Cl.$^5$ ............................................. F02K 9/00
[52] U.S. Cl. ............................ 60/257; 60/267; 60/225; 165/111; 165/164
[58] Field of Search ............ 60/257, 259, 266, 267, 60/204, 224, 225

[56] References Cited

U.S. PATENT DOCUMENTS 3,452,541  7/1969  Builder ............................... 60/257

FOREIGN PATENT DOCUMENTS 0754141  8/1956  United Kingdom .................. 60/257

Primary Examiner—Richard A. Bertsch
Assistant Examiner—Howard Richman
Attorney, Agent, or Firm—John R. Duncan; Frank D. Gilliam

[57] ABSTRACT

An air liquefier and separator of air constituents for a liquid air engine. Its unique structure captures the ambient air and guides it through guide vanes into a bank of spiral tubes or channels where the air is completely contained while being liquified and separated into its constituents. The spiral tubes or channels provide a compact heat exchanger design with long tube length or channel length for efficient heat transfer and liquefying of the air which is accomplished by a flow of liquid hydrogen flowing either inside a concentric tube inside the air condensing tube or flowing in a tube or channel with a common wall in contact with the air condensing tube or channel. The liquefier can easily be designed to be an integral part of a liquid air jet engine installation.

16 Claims, 2 Drawing Sheets

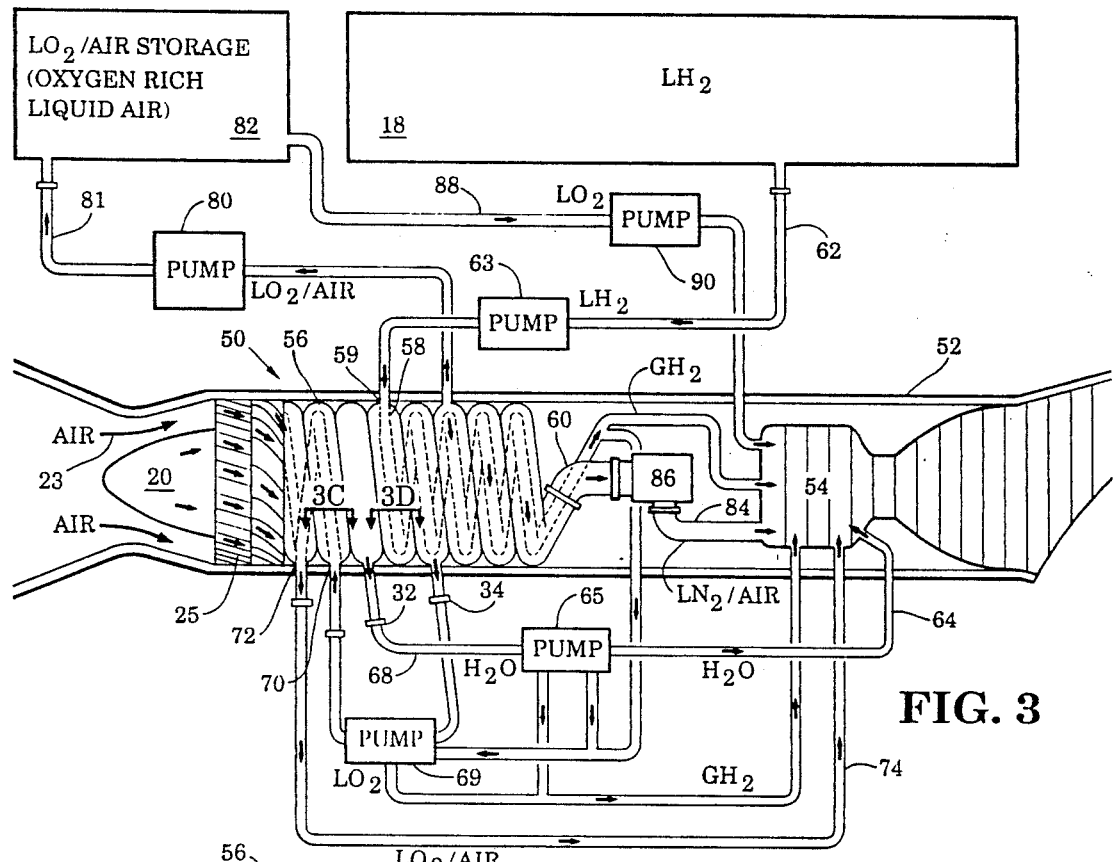
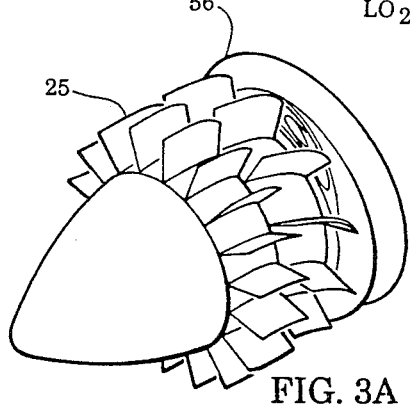
FIG. 3A
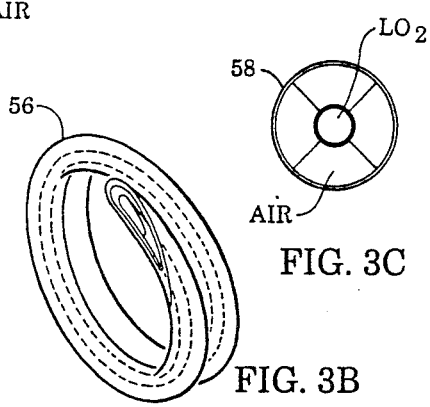
FIG. 3B
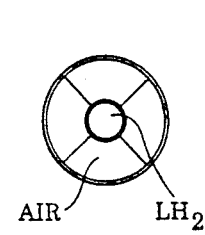
FIG. 3C   FIG. 3D
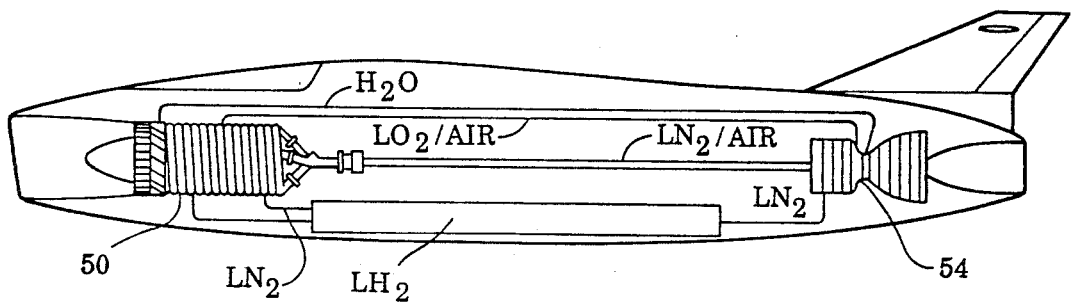
FIG. 4

AIR LIQUEFIER AND SEPARATOR OF AIR CONSTITUENTS FOR A LIQUID AIR ENGINE

BACKGROUND OF THE INVENTION

The invention relates to liquid air engines and more specifically to structure for taking ambient air and transforming it into liquid air while at the same time separating and collecting specific air constituents in a liquid state.

An example of a prior art liquid air jet propulsion engine that utilizes ambient air drawn into the front of the engine for combustion purposes is illustrated in U.S. Pat. No. 3,452,541. The ambient air is passed through a heat exchanger having liquid hydrogen piped therethrough for liquefying the ambient air.

Another prior art example of a liquid air jet propulsion engine that takes in ambient air at its front end and processes it into liquid air is described in U.S. Pat. No. 3,756,024. It's. structure also takes the ambient air and passes it through a heat exchanger where it is cooled by liquid hydrogen that is passed through the heat exchanger. The ambient air which has been cooled to a very low temperature in the heat exchanger is then compressed into a liquid in a condenser and then transmitted in this state to a rocket nozzle for consumption.

SUMMARY OF THE INVENTION

The novel air liquefier and separator of air constituents can easily be designed to be an integral part of a liquid air jet installation. The invention is suitable for a multitude of vehicles (rockets, aircraft, ground vehicles) and engines (jets, turbines, internal combustion, etc.).

One version of the novel air liquefier has an elongated tubular member helically wound into the shape of a primary cylindrical coil having a front end and a rear end. The rear end of the primary cylindrical coil has an inlet end that is connected to a source of liquid hydrogen. The front end of the primary cylindrical coil has an outlet end through which the liquid hydrogen exits. The primary cylindrical coil has a predetermined outer diameter $D1$ and it also has a longitudinal x-axis. A nose cone member is fixedly mounted longitudinally in front of the cylindrical coil and it has a predetermined diameter $D2$. An annular air inlet passageway surrounds the nose member for receiving ambient air. The air inlet passageway has an outer diameter $D3$ and an inner diameter substantially equal to $D2$. An annular shaped turning vane assembly is mounted in the annular air inlet passageway adjacent the rear end of the nose member. A plurality of elongated tubular channels for receiving the ambient air after it passes through the turning vane assembly are wound helically into a cylindrical coil configuration having an inner diameter substantially equal to $D1$. These tubular channels concentrically surround the primary cylindrical coil in the manner of a heat exchanger. The tubular channels have their inlet ends positioned in axial alignment with the turning vane assembly and the outlet ends of the tubular channels are sealed closed. There is a first tubular tap-off connection in communication with each of the respective tubular channels a predetermined distance along their length from their inlet ends for removing liquefied water. A second tubular tap-off connection is in communication with each of the respective tubular channels at a predetermined location between the first tap-off connection and the closed end of the channels for removing oxygen rich liquid air. A third tubular tap-off connection is in communication with each of the respective tubular channels at a predetermined location after the first and second tap-off connections and these are adjacent the closed ends of the channels for removing nitrogen rich air. Thus, the ambient air as it passes from front to rear through the tubular channels will be cooled first to a temperature at which liquid water is formed, then it continues to be cooled until the liquid oxygen separates from the air and finally the air is cooled to a temperature where liquid nitrogen or air is formed. The cooling of the ambient air is a result of the extremely cold temperature of the liquid hydrogen that is passed in heat exchanger relationship through the tubular channels that have been wound helically into a cylindrical coil configuration.

A second version of the novel air liquefier utilizes a similar primary cylindrical coil whose inlet end is connected to a source of liquid hydrogen. This version also has a similar nose cone member, an annular air inlet passageway, and an annular shaped turning vane assembly. A different structure is used in the form of an elongated cylindrical housing that surrounds the primary cylindrical coil. The front end of the cylindrical housing is positioned adjacent the rear end of the annular turning vane assembly and a rear wall closes the cylindrical housing. The cylindrical housing has a predetermined inner diameter greater than the outer diameter $D1$ of the primary cylindrical coil thereby forming an annular chamber therein. An elongated annular shaped spiral wall has its front end positioned adjacent the rear end of the turning vane assembly. The inner diameter of the spiral wall is substantially equal to $D1$ to form a seal with the primary cylindrical coil and the outer diameter of the spiral wall is substantially equal to the inner diameter of the cylindrical housing to form a seal therewith. The spiral wall and its associated structure thus forms a helical tube that extends from the turning vane assembly to the rear wall of the cylindrical housing. Similar first, second, and third tubular tap-off connections are in communication with the helical tube at predetermined distances along its length from its inlet end for removing sequentially, liquified water, liquified oxygen rich air and liquified nitrogen rich air.

In both of the previously discussed versions of the novel air liquefier, the air is completely contained while being liquefied and separated into its constituents. The spiral tubes or channels provide a compact heat exchanger design with long tube length or channel length for efficient heat transfer and liquefying of the air is accomplished by a flow of liquid hydrogen flowing through the primary cylindrical coil that has a common wall in contact with the air condensing tube or channel.

A third version of the novel air liquefier also has a primary cylindrical coil formed of one or more elongated tubular members helically wound into the shape of a cylindrical coil. There is an air inlet at its front end and an air outlet at its rear end. A nose member is mounted longitudinally in front of the primary cylindrical coil and it is surrounded by an annular air inlet passageway for receiving ambient air. An annular shaped turning vane assembly is fixedly mounted in the annular air inlet passageway adjacent the rear end of the nose member. An elongated tubular member passes concentrically and helically through the interior of the primary coil for a predetermined portion of its longitudinal length. The inlet end of the tubular member is connected to a source of liquid hydrogen. The outlet end of the tubular member is connected to the combustor unit. Tap-off connections are in communication with the interior of the primary cylindrical coil and they are spaced a predetermined distance along its length for removing respectively, liquified water and liquified oxygen rich air and liquefied nitrogen rich air at the outlet. The outlet end of the primary cylindrical coil is connected to the combustor unit.

The novel air liquefiers all provide for a separation and tap-off of liquids and gases with different boiling temperatures. The nature of the structure of the heat exchangers allow for efficient heat transfer in long equivalent tube length in either concentric tubes or adjoining tubes and channels. The spiral flow arrangement forces the liquid to the outside wall by centrifugal force without any moving parts and thereby separates liquid constituents (water, nitrogen, oxygen) for easy collection (tap-off) as the temperature drops along the flow passage. The low vapor pressure of the condensed and subcooled liquid nitrogen and liquid oxygen lowers the pressure inside the condenser tubes or channels; thus creating a near vacuum which results in ambient air being sucked into the condenser tubes or channels and thereby making the liquefier self-feeding with ambient air without any fan or compressor at the air inlet.

The complete separation of the engine inlet and liquefier from the combustor and jet exit nozzle has many different advantages. It allows for the air inlets and exhaust exits to be located at the most desirable and at different locations in the vehicle (for example, the aircraft nose section and the tail section). Also a matching of the inlet area and shape with the combustor and exhaust nozzle is not required for designing overall engine cross-section and for integration as a single unit installation. Further, if desirable, inlet area and shape can be easily adapted to integration with the combustor and exhaust nozzle.

DESCRIPTION OF THE DRAWINGS

FIG. 3 is a second alternative embodiment of the novel air liquefier and separator of air constituents for a liquid air engine;

FIG. 3A is a partial front perspective view of the embodiment illustrated in FIG. 3 with portions broken away;

FIG. 3B is an elevational view taken along lines 3B—3B of FIG. 3;

FIG. 3C is a cross-sectional view taken along lines 3C—3C of FIG. 3;

FIG. 3D is a cross-sectional view taken along lines 3D—3D of FIG. 3; and

FIG. 4 is a schematic illustration showing the manner in which the air liquefier and separator of air constituents can be located in a vehicle remote from its propulsion unit.

DESCRIPTION OF THE PREFERRED EMBODIMENT

Figure 1:
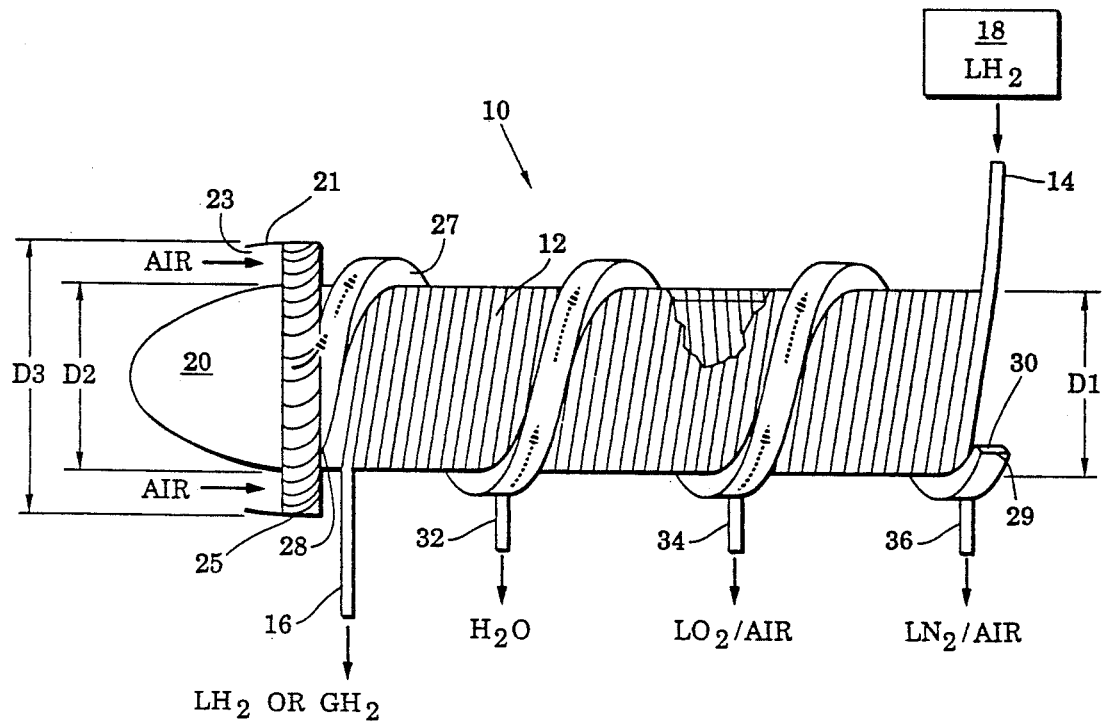
FIG. 1 is a side elevation view of applicant's novel air liquefier and separator of air constituents for a liquid air engine.

Applicant's novel air liquefier and separator of air constituents for a liquid air engine will now be described by referring to FIGS. 1-4 of the drawings. The air liquefier is generally designated numeral 10.

Air liquefier 10 has an elongated tubular member helically wound into the shape of a primary cylindrical coil 12. It has an inlet end 14 and an outlet end 16. It has an outer diameter D1. A source of liquid hydrogen 18 is connected to inlet end 14. A bullet shaped nose member 20 is mounted in front of primary coil 12 and it has an outer diameter D2. Outer cylindrical casing 21 has a diameter D3 and an annular inlet passageway 23 is formed around bullet nose member 20. An annular shaped turning vane assembly 25 is fixedly mounted in annular air inlet passageway 23 adjacent the rear end of nose member 20. A plurality of elongated tubular channels 27 for receiving the ambient air are helically wound into a cylindrical coil configuration having an inner diameter substantially equal to D1 so that it is in surface contact with the outer surface of primary cylindrical coil 12 in the manner of a heat exchanger. Tubular channels 27 have inlet ends 28 and rear ends 29 that are closed by end caps 30. A first tubular tap-off connection 32 is in communication with each of the respective tubular channels 27 for removing liquefied water. A second tubular tap-off connection 34 is in communication with each of the respective tubular channels 27 for removing liquefied oxygen rich air. A third tubular tap-off connection 36 is in communication with each of the respective tubular channels 27 adjacent the closed ends of the channels for removing liquefied nitrogen rich air.

Figure 2:
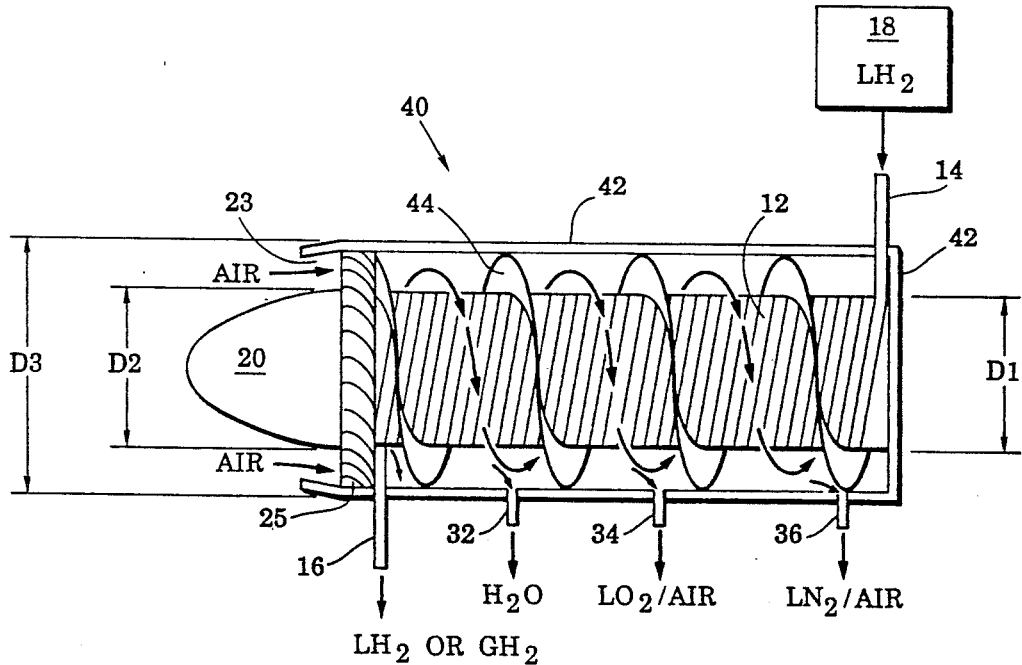
FIG. 2 is a side elevation view of a first alternative embodiment of the novel air liquefier and separator.

A first alternative air liquefier 40 is illustrated in FIG. 2. It functions in a manner very similar to that of air liquefier 10 and like components are identified by identical numerals. It has a nose member 20, an annular air inlet passageway 23, a turning vane assembly 25, a primary coil 12, and a source 18 of liquid hydrogen. A cylindrical housing 42 having an end wall 43 surrounds primary coil 12. An elongated annular shaped spiral wall 44 has its front end positioned adjacent the rear end of turning vane assembly 25 and its rear end positioned adjacent rear wall 43. The inner diameter of spiral wall 44 is substantially equal to D1 to form a seal therewith and the outer diameter of spiral wall 44 is substantially equal to the inner diameter of cylindrical housing 42 to form a seal therewith. Spiral wall 44 and its associated structure thus form a helical tube that extends from the turning vane assembly 25 to the rear wall 43 of cylindrical housing 42. A first tubular tap-off connection 32 is in communication with the helical tube a predetermined distance from its length from its inlet end for removing liquefied water. A second tubular tap-off connection 34 is in communication with the helical tube for removing liquefied oxygen rich air. A third tubular tap-off connection 36 is in communication with the helical tube at a position adjacent rear wall 43 for removing nitrogen rich liquid air.

A second alternative air liquefier 50 is described in FIGS. 3-3D. It has a bullet nose member 20, a turning vane assembly 25, a cylindrical housing 52 and a combustor 54. Annular air inlet 23 is axially aligned with turning vane assembly 25. A primary cylindrical coil 56 is formed of a plurality of tubular members that are helically wound into the shape of a cylindrical coil. In FIG. 3A a partial perspective view of the front end of primary cylindrical coil 56 is shown in alignment with nose cone 20 and turning vane assembly 25. The start of one of the several tubes forming primary cylindrical coil 56 is illustrated in FIG. 3B.

An elongated tubular member 58 passes concentrically in helical fashion through the interior of the primary coil 56 for a predetermined portion of its longitudinal length. It has an inlet end 59 and an outlet end 60. Liquid hydrogen tank 18 is connected by tubular member 62 through pump 63 to inlet end 59 of tubular member 58. Outlet end 60 is connected to combustor unit 54. A first tap-off connection 32 is connected to tubular member 64 and pump 65 for removing liquified water which is carried to combustor unit 54. A second tap-off connection 34 is connected to tubular member 68 and pump 69 for removing liquefied oxygen rich air that is transmitted to connection 70 of cylindrical coil 56 where it is transmitted into a concentric tube therein for a specific number of coils of wrap and then exiting at tap-off connection 72 which is connected to tubular member 74 and it carries the oxygen rich liquid air to combustor unit 54. Another tubular member 81 is connected to pump 80 and it transmits some of the oxygen rich liquid air to cylindrical coil 56 Since the outlet end of cylindrical coil 56 is not closed, the liquid nitrogen rich air passes out its rear end and into pump 86. A tubular member 84 transmits liquid air from pump 86 to combustor unit 54. Tubular member 88 is connected to pump 90 for transmitting oxygen rich air to combustor 54. FIGS. 3C and 3D are cross-sectional views taken along cylindrical coil 56 to show the tubular member that is concentrically passed through the turns of coil 56.

A schematic illustration shown in FIG. 4 depicts a vehicle showing how the liquid air collectors, separators and pumps can be mounted up front which provides them with optimum inlet conditions. The liquid nitrogen and liquid oxygen can be transferred easily through the vehicle in small tubular connector lines to the propulsion unit 54. This propulsion unit can be located anywhere convenient.

What is claimed is:

1. An air liquefier and separator of air constituents for a liquid air engine comprising:
    an elongated tubular member helically wound into the shape of a primary cylindrical coil having a front end and a rear end, said tubular member having an inlet end and outlet end, said inlet end being adjacent to the rear end of said cylindrical coil and said outlet end being adjacent to the front end of said cylindrical coil, said cylindrical coil having a predetermined outer diameter D1 and a longitudinal extending x-axis;
    a liquid hydrogen source connected to the inlet end of said tubular member;
    a nose member mounted longitudinally in front of said cylindrical coil, said nose member having a front end, a rear end and a predetermined outer diameter D2;
    an annular air inlet passageway surrounding said nose member for receiving ambient air, said passageway having an outer diameter D3 and an inner diameter substantially equal to D2;
    an annular shaped turning van assembly being fixedly mounted in said annular inlet passageway adjacent to the rear end of said nose member; and
    ambient air guiding means receiving ambient air from said turning vane for directing said ambient air spirally around, adjacent to and along the length of said elongated tubular member.

2. An air liquefier and separator of air constituents for a liquid air engine comprising:
    an elongated tubular member helically wound into the shape of a primary cylindrical coil having a front end and a rear end, said tubular member having an inlet end and an outlet end, said inlet end being adjacent the rear end of said cylindrical coil and said outlet end being adjacent the front end of said cylindrical coil, said cylindrical coil having a predetermined outer diameter D1 and a longitudinally extending X-axis;
    a liquid hydrogen source connected to the inlet end of said tubular member;
    a nose member mounted longitudinally in front of said cylindrical coil, said nose member having a front end, a rear end and a predetermined outer diameter D2;
    an annular air inlet passageway surrounding said nose member for receiving ambient air, said passageway having a front end and a rear end, and a turning van assembly being fixed mounted in said annular inlet passageway adjacent the rear end of said nose member;
    a plurality of elongated tubular channels for receiving the ambient air and they are wound helically into a cylindrical coil configuration having an inner diameter substantially equal to D1, said tubular channels concentrically surrounding said primary cylindrical coil in the manner of a heat exchanger, said tubular channels having inlet ends that are positioned in axial alignment with said turning van assembly, said tubular channels having outlet ends that are sealed closed;
    a first tubular tap-off connection in communication with each of the respective tubular channels at a location where liquified water is formed by the cooling of said ambient air by said liquid hydrogen flowing through said tubular member for removing said liquified water.

3. An air liquefier and separator of air constituents for a liquid air engine as recited in claim 2 further comprising a second tubular tap-off connection in communication with each of the respective tubular channels at a location between said first tap-off connection and the closed end of said channels at a location where liquified oxygen rich air is formed by the cooling of said ambient air by said liquid hydrogen flowing through said tubular member for removing said liquefied oxygen rich air.

4. An air liquefier and separator of air constituents for a liquid air engine as recited in claim 3 further comprising a third tubular tap-off connection in communication with each of the respective tubular channels at a location after said first and second tap-off connections and adjacent the closed ends of said channels at a location where liquified nitrogen rich air is formed by the cooling of said ambient air by said liquid hydrogen flowing through said tubular member for removing said liquefied nitrogen rich air.

5. an air liquefier and separator of air constituents for a liquid air engine comprising:
    an elongated tubular member helically wound into the shape if a primary cylinder coil having a front end and a rear end, said tubular member having an inlet end and an outlet end, said inlet end being adjacent to the rear end of said cylindrical coil and said outlet end being adjacent to the front end of said cylindrical coil, said cylindrical coil having a predetermined outer diameter D1 and a longitudinally extending x-axis:
    a liquid hydrogen source connected to the inlet end of said tubular member;

a nose member mounted longitudinally in front of said cylindrical coil, said nose member having a front end, a rear end and a predetermined outer diameter D2;

an annular air inlet passageway surrounding said nose member for receiving ambient air, said passageway having an outer diameter D3 and inner diameter substantially equal to D2;

an annular shaped turning vane assembly being fixedly mounted in said annular inlet passageway adjacent to the rear end of said nose member;

an elongated cylindrical housing having a front end and a rear end, said front end being positioned adjacent to the rear end of said annular shaped turning van assembly, said cylindrical housing having a predetermined inner diameter greater than the outer diameter D1 of said primary cylindrical coil thereby forming an annular chamber, a rear wall for closing said cylindrical housing;

an elongated annular shaped spiral wall having a front end and a rear end, the front end of said spiral wall positioned adjacent to the rear end of said turning vane assembly, the inner diameter of said spiral wall being substantially equal to D1 to form a seal therewith and the outer diameter of said spiral wall being substantially equal to the inner diameter of said cylindrical housing to form a seal therewith, the spiral wall and its associated structure thus forming a helical tube that extends from the turning vane assembly to the rear wall of said cylindrical housing; and a first tubular tap-off connection in communication with said helical tube at a distance along its length from its inlet end at a location where liquified water is formed from the cooling of said ambient air by said liquid hydrogen flowing through said tubular member for removing liquified water.

6. An air liquefier and separator of air constituents for a liquid air engine as recited in claim 5 further comprising a second tubular tap-off connection in communication with said helical tube at a location between said first tap-off connection and the rear wall of said cylindrical housing at a location where liquified oxygen rich air is formed from the cooling of said ambient air by said liquid hydrogen flowing through said tubular member for removing liquefied oxygen rich air.

7. An air liquefier and separator of air constituents for a liquid air engine as recited in claim 6 further comprising a third tap-off connection in communication with said helical tube at a location after said second tap-off connection and adjacent the rear end of said cylindrical housing at a location where liquified nitrogen rich air is formed from the cooling of said ambient air by said liquid hydrogen flowing through said tubular member for removing liquefied nitrogen rich air.

8. An air liquefier and separator of air constituents for a liquid air engine comprising:

a primary cylindrical coil having a front end and a rear end, said primary cylindrical coil being formed of at least one elongated tubular member helically wound into the shape of a cylindrical coil, said primary cylindrical coil having an air inlet at its front end and an air outlet at its rear end, said cylindrical coil having a longitudinally extending x-axis;

a nose member mounted longitudinally in front of said primary cylindrical coil, said nose member having a front end and a rear end and a predetermined outer diameter D2;

an annular air inlet passageway surrounding said nose member for receiving ambient air, said passageway having an outer diameter D3 and an inner diameter substantially equal to D3;

an annular shaped turning vane assembly having a front end and a rear end, said turning vane assembly being fixedly mounted in said annular air inlet passageway adjacent the rear end of said nose member;

an elongated tubular member that passes concentrically and helically through the interior of said primary coil for a portion of its longitudinal length, said tubular member having an inlet end and an outlet end;

a liquid hydrogen source connected to the inlet end of said tubular member; and a first tap-off connection in communication with the interior of said primary cylindrical coil spaced at a location along its length where liquified water is formed by the cooling of said ambient air by said liquid hydrogen flowing through said tubular member for removing said liquified water.

9. An air liquefier and separator of air constituents for a liquid air engine as recited in claim 8 further comprising a second tap-off connection in communication with the interior of said primary cylindrical coil at a location along its length between said first tap-off connection and the rear end of said primary cylindrical coil where liquified oxygen rich air is formed by the cooling of said ambient air by said liquid hydrogen flowing through said tubular member for removing said liquified oxygen rich air.

10. An air liquefier and separator of air constituents for a liquid air engine as recited in claim 9 further comprising a combustor propulsion unit longitudinally spaced a distance rearwardly of said primary cylindrical coil.

11. An air liquefier and separator of air constituents for a liquid air engine as recited in claim 10 wherein the rear end of said primary cylindrical coil is connected to said combustor propulsion unit for supplying nitrogen rich liquefied air that has been produced from the ambient air entering the front end of said primary cylindrical coil.

12. An air liquefier and separator of air constituents for a liquid air engine as recited in claim 10 wherein the outlet end of said elongated tubular member that passes concentrically through the interior of said primary cylindrical coil is connected to said combustor propulsion unit for supplying liquid or gasified hydrogen thereto.

13. An air liquefier and separator of air constituents for a liquid air engine as recited in claim 10 wherein said first tap-off connection is connected to said combustor propulsion unit for supplying liquefied water thereto that has been removed from the ambient air passing through said primary cylindrical coil.

14. An air liquefier and separator of air constituents for a liquid air engine as recited in claim 9 wherein said second tap-off connection is connected to said combustor propulsion unit for supplying liquefied oxygen rich air thereto that has been removed from the ambient air passing through said primary cylindrical coil.

15. An air liquefier and separator of air constituents for a liquid air engine comprising:

an elongated tubular member helically wound into the shape of a primary cylindrical coil having a front end and a rear end, said tubular member having an inlet end and an outlet end, said inlet end being adjacent the rear end of said cylindrical coil and said outlet end being adjacent the front end of said cylindrical coil, said cylindrical coil having a predetermined outer diameter D1 and a longitudinally extending x-axis;

a liquid hydrogen source connected to the inlet end of said tubular member;

a nose member mounted longitudinally in front of said cylindrical coil, said nose member having a front end, a rear end and a predetermined outer diameter D2;

an annular air inlet passageway surrounding said nose member for receiving ambient air, said passageway having a front end and a rear end, and a turning vane assembly being fixed mounted in said annular inlet passageway adjacent the rear end of said nose member;

a plurality of elongated tubular channels for receiving the ambient air and they are wound helically into a cylindrical coil configuration having an inner diameter substantially equal to D1, said tubular channels concentrically surrounding said primary cylindrical coil in the manner of a heat exchanger, said tubular channels having inlet ends that are positioned in axial alignment with said turning van assembly, said tubular channels having outlet ends that are sealed closed;

a first tubular tap-off connection in communication with each of the respective tubular channels at a location along their length from their inlet ends where liquified water is formed by the cooling of said ambient air by said liquid hydrogen flowing through said tubular member for removing said liquified water.

16. An air liquefier and separator of air constituents for a liquid air engine comprising;

an elongated tubular member helically wound into the shape of a primary cylindrical coil having a front end and a rear end, said tubular member having an inlet end and an outlet end, said inlet end being adjacent the rear end of said cylindrical coil and said outlet end being adjacent the front end of said cylindrical coil, said cylindrical coil having a predetermined outer diameter D1 and a longitudinally extending x-axis;

a liquid hydrogen source connected to the inlet end of said tubular member;

a nose member mounted longitudinally in front of said cylindrical coil, said nose member having a front end, a rear end and a predetermined outer diameter D2;

an annular air inlet passageway surrounding said nose member for receiving ambient air, said passageway having an outer diameter D3 and an inner diameter substantially equal to D2;

an annular shaped turning vane assembly being fixedly mounted in said annular inlet passageway adjacent the rear end of said nose member;

an elongated cylindrical housing having a front end and a rear end, said front end being positioned adjacent the rear end of said annular shaped turning vane assembly, said cylindrical housing having a predetermined inner diameter greater than the outer diameter D1 of said primary cylindrical coil thereby forming an annular chamber, a rear wall for closing said cylindrical housing;

an elongated annular shaped spiral wall having a front end and a rear end, the front end of said spiral wall positioned adjacent the rear end of said turning van assembly, the inner diameter of said spiral wall being substantially equal to D1 to form a seal therewith and the outer diameter of said spiral wall being substantially equal to the inner diameter of said spiral wall being substantially equal to the inner diameter of said cylindrical housing to form a seal therewith, the spiral wall and its associated structure thus forming a helical tube that extends from the turning vane assembly to the rear wall of said cylindrical housing; and a first tubular tap-off connection in communication with said helical tube at a location along its length from its inlet end where liquified water is formed by the cooling of said ambient air by said liquid hydrogen flowing through said tubular member for removing said liquefied water.

* * * * *